United States Patent
Suzuki

(10) Patent No.: US 12,420,862 B2
(45) Date of Patent: Sep. 23, 2025

(54) STEERING CONTROLLER AND STEERING CONTROL METHOD

(71) Applicant: ISUZU MOTORS LIMITED, Tokyo (JP)

(72) Inventor: Motoya Suzuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 190 days.

(21) Appl. No.: 18/447,917

(22) Filed: Aug. 10, 2023

(65) Prior Publication Data
US 2024/0083496 A1    Mar. 14, 2024

(30) Foreign Application Priority Data

Sep. 9, 2022  (JP) ................. 2022-143755

(51) Int. Cl.
*B62D 6/00* (2006.01)
*B62D 15/02* (2006.01)

(52) U.S. Cl.
CPC ......... *B62D 6/001* (2013.01); *B62D 15/0215* (2013.01); *B62D 15/025* (2013.01)

(58) Field of Classification Search
CPC .. B62D 6/001; B62D 15/0215; B62D 15/025; B62D 6/00; B62D 6/002; B62D 6/003; B62D 6/005; B60W 50/08
See application file for complete search history.

(56) References Cited

U.S. PATENT DOCUMENTS

2019/0193731 A1*  6/2019  Irie ................. B60W 50/14

FOREIGN PATENT DOCUMENTS

JP  2021-146920 A  9/2021

* cited by examiner

*Primary Examiner* — Jacob M Amick
(74) *Attorney, Agent, or Firm* — PROCOPIO, CORY, HARGREAVES & SAVITCH LLP

(57) ABSTRACT

A steering controller includes: a generation part that generates a vehicle model indicating a relationship between a velocity, a steering angle, a lateral deviation, an azimuth deviation of a vehicle, and a curvature; a calculation part that calculates, as an optimal steering angle, a steering angle that minimizes an output value of an evaluation function including an estimated lateral deviation and an estimated azimuth deviation calculated on the basis of a vehicle model, the steering angle, a change amount of the steering angle, a first weighting coefficient, a second weighting coefficient, a third weighting coefficient, and a fourth weighting coefficient; a second acquisition part that acquires a required acceleration; and an updating part that updates at least one weighting coefficient among the first weighting coefficient, the second weighting coefficient, the third weighting coefficient, and the fourth weighting coefficient according to the required acceleration.

8 Claims, 5 Drawing Sheets

STEERING CONTROLLER AND STEERING CONTROL METHOD

CROSS-REFERENCE TO RELATED APPLICATIONS

The present application claims priority to Japanese Patent Applications number 2022-143755, filed on Sep. 9, 2022 contents of which are incorporated herein by reference in their entirety.

BACKGROUND OF THE INVENTION

The present disclosure relates to a steering controller and a steering control method. An automatic steering system in which a target steering angle for causing a vehicle to follow a target trajectory is obtained, and the vehicle is driven in accordance with the obtained target steering angle has been known (for example, refer to Japanese Unexamined Patent Application Publication No. 2021-146920).

In conventional automatic steering systems, a linear vehicle prediction model was used to obtain a steering angle to follow a target trajectory. However, when a vehicle velocity changes due to acceleration or deceleration of a vehicle, the vehicle may behave non-linearly, thereby causing a model error between actual behavior of the vehicle and the vehicle model. This results in degradation of control accuracy.

BRIEF SUMMARY OF THE INVENTION

The present disclosure focuses on this point, and its object is to prevent degradation of following accuracy at the time of acceleration or deceleration of a vehicle.

A first aspect of the present disclosure provides a steering controller which causes a vehicle to follow a target trajectory; the steering controller including a first acquisition part that acquires a velocity of the vehicle, a steering angle of the vehicle, a lateral deviation with respect to the target trajectory of the vehicle, an azimuth deviation that is a difference between a direction of the vehicle and a target direction of the vehicle, and a curvature of a road surface on which the vehicle travels, at predetermined intervals; a generation part that generates a vehicle model indicating a relationship between the velocity, the steering angle, the lateral deviation, the azimuth deviation, and the curvature; a calculation part that calculates, as an optimal steering angle, the steering angle that minimizes an output value of an evaluation function including an estimated lateral deviation and an estimated azimuth deviation calculated on the basis of the vehicle model, the steering angle, a change amount of the steering angle, a first weighting coefficient of a term corresponding to the estimated lateral deviation, a second weighting coefficient of a term corresponding to the estimated azimuth deviation, a third weighting coefficient of a term corresponding to the steering angle, and a fourth weighting coefficient of a term corresponding to the amount of change; a second acquisition part that acquires a required acceleration when accelerating or decelerating the vehicle; and an updating part that updates at least one weighting coefficient among the first weighting coefficient, the second weighting coefficient, the third weighting coefficient, and the fourth weighting coefficient according to the required acceleration.

A second aspect of the present disclosure provides a steering control method, executed by a computer, for causing a vehicle to follow a target trajectory, the steering control method comprising the steps of: acquiring a velocity of the vehicle, a steering angle of the vehicle, a lateral deviation of the vehicle with respect to the target trajectory, an azimuth deviation that is a difference between a direction of the vehicle and a target direction of the vehicle, and a curvature of a road surface on which the vehicle travels, at predetermined intervals; generating a vehicle model indicating a relationship between the velocity, the steering angle, the lateral deviation, the azimuth deviation, and the curvature; calculating, as an optimal steering angle, the steering angle that minimizes an output value of an evaluation function including an estimated lateral deviation and an estimated azimuth deviation calculated on the basis of the vehicle model, the steering angle, a change amount of the steering angle, a first weighting coefficient of a term corresponding to the estimated lateral deviation, a second weighting coefficient of a term corresponding to the estimated azimuth deviation, a third weighting coefficient of a term corresponding to the steering angle, and a fourth weighting coefficient of a term corresponding to the change amount; acquiring a required acceleration when accelerating or decelerating the vehicle; and updating at least one weighting coefficient among the first weighting coefficient, the second weighting coefficient, the third weighting coefficient, and the fourth weighting coefficient according to the required acceleration.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of a Driving Control System>

Figure 1:
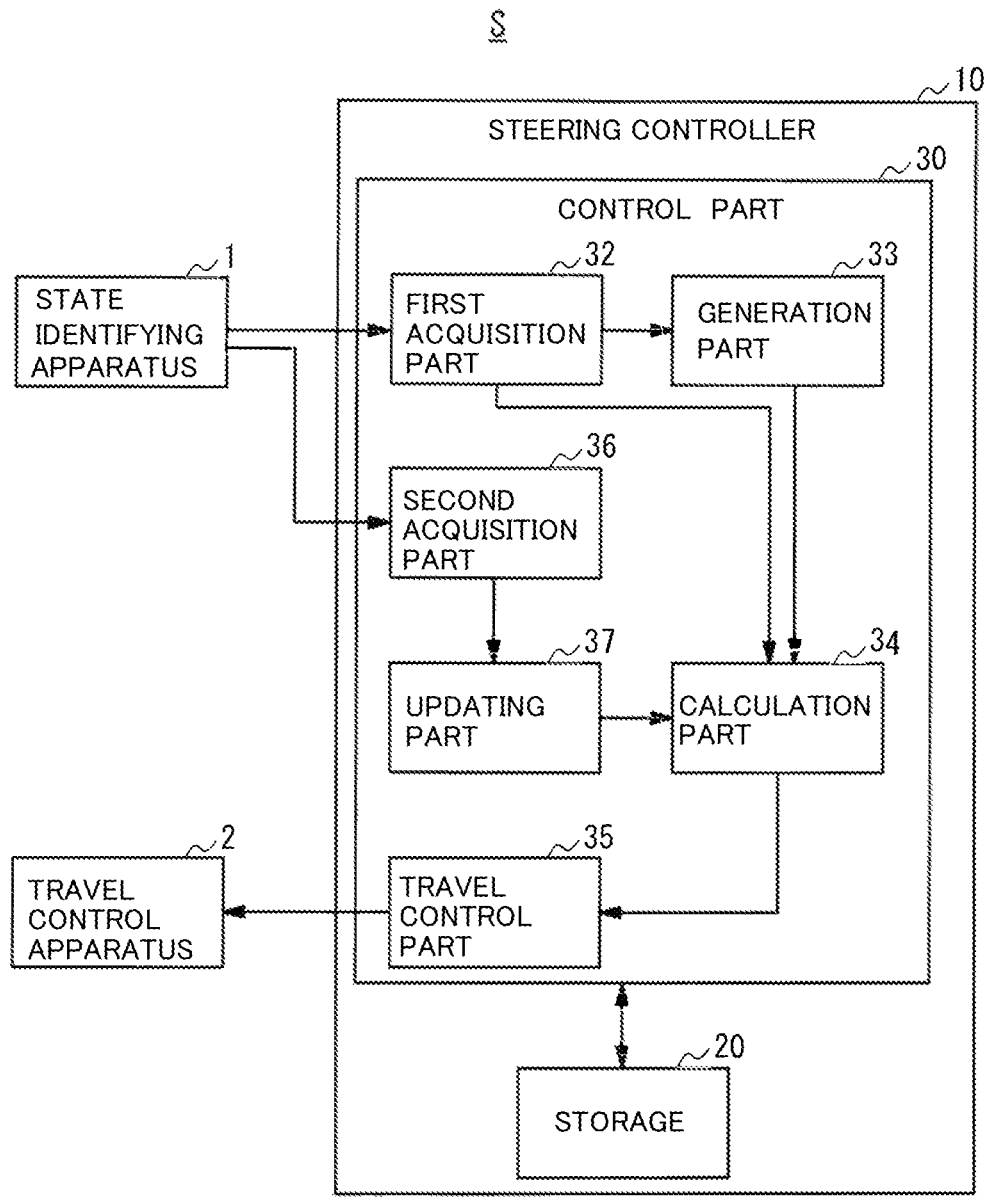
FIG. 1 shows a configuration of a driving control system S.

FIG. 1 shows a configuration of a driving control system S. The driving control system S is a system for causing a vehicle to travel along a target trajectory by controlling a steering angle of the vehicle. The driving control system S is mounted on the vehicle. The target trajectory is a predetermined trajectory, and includes a plurality of travel positions that are targets for the vehicle and directions, corresponding to the plurality of travel positions, that are targets for the vehicle. The driving control system S includes a state identifying apparatus 1, a travel control apparatus 2, and a steering controller 10.

The state identifying apparatus 1 identifies a parameter indicating the state of the vehicle, at a regular control period. The parameter indicating the state of the vehicle includes, for example, a velocity, a steering angle, a lateral deviation, an azimuth deviation, and a curvature of a road surface. The lateral deviation is a difference between a traveling position of the vehicle and a target traveling position of the vehicle, in a direction orthogonal to the traveling direction of the vehicle. The azimuth deviation is a difference between the direction of the vehicle at the position at which the vehicle is travelling and the target direction of the vehicle corresponding to this position.

The state identifying apparatus 1 acquires a velocity of the vehicle measured by a velocity sensor, for example. Further, the state identifying apparatus 1 acquires a steering angle of the vehicle measured by a steering angle sensor, for example. The steering angle acquired by the state identifying apparatus 1 is a rotation angle of a steering wheel shaft, or a difference between the direction of the vehicle and the direction of a tire of the vehicle.

The state identifying apparatus 1 acquires the position and the direction of the vehicle by obtaining a GPS (Global Positioning System) signal, for example. The state identifying apparatus 1 identifies the lateral deviation of the vehicle on the basis of the acquired vehicle position and the target travel position for the vehicle corresponding to the position of the vehicle. The state identifying apparatus 1 identifies the azimuth deviation of the vehicle on the basis of the acquired direction of the vehicle and the target direction of the vehicle corresponding to the position of the vehicle.

The state identifying apparatus 1 identifies the curvature of the road surface corresponding to the acquired position of the vehicle, on the basis of map information stored in a storage of the state identifying apparatus 1, for example. The state identifying apparatus 1 outputs the velocity, the steering angle, the lateral deviation, the azimuth deviation, and the curvature of the road surface to the steering controller 10 at a regular control period.

The travel control apparatus 2 controls the velocity and the direction of the vehicle. The travel control apparatus 2 controls the direction of the vehicle in accordance with a steering angle at the time of the next control period. The steering angle is output by the steering controller 10 at the regular control period.

The steering controller 10 controls the steering angle in order to cause the vehicle to follow the target trajectory. The steering controller 10 generates a vehicle model corresponding to the state of the vehicle input from the state identifying apparatus 1. The steering controller 10 uses the generated vehicle model to calculate the steering angle at the regular control period, in order to cause the vehicle to travel in a target direction. The regular control period is a sampling period in the model prediction control. The steering controller 10 inputs the calculated steering angle to the travel control apparatus 2, thereby causing the vehicle to travel in the target direction. Hereinafter, the configuration and operation of the steering controller 10 will be described in detail.

<Configuration of the Steering Controller>

As shown in FIG. 1, the steering controller 10 includes a storage 20 and a control part 30.

The storage 20 includes a read only memory (ROM) storing a basic input output system (BIOS) of a computer or the like, and a random access memory (RAM) serving as a work area. The storage 20 is a large-capacity storage device such as a hard disk drive (HDD), a solid state drive (SSD), and the like that stores an operating system (OS), an application program, and various types of information to be referred to at the time of executing the application program.

The control part 30 is a processor such as a central processing unit (CPU) or a graphics processing unit (GPU). The control part 30 functions as a first acquisition part 32, a generation part 33, a calculation part 34, a travel control part 35, a second acquisition part 36, and an updating part 37 by executing the program stored in the storage 20.

The first acquisition part 32 acquires a state quantity of the vehicle output from the state identifying apparatus 1 at predetermined intervals (control period). Specifically, the first acquisition part 32 acquires a velocity of the vehicle, a steering angle of the vehicle, a lateral deviation with respect to a target trajectory of the vehicle, an azimuth deviation that is a difference between a direction of the vehicle and a target direction of the vehicle, and a curvature of a road surface on which the vehicle travels, at predetermined intervals. The first acquisition part 32 stores the acquired state quantity of the vehicle in the storage 20.

The generation part 33 generates a vehicle model indicating a relationship between the velocity, the steering angle, the lateral deviation, the azimuth deviation, and the curvature. For example, the generation part 33 generates a vehicle model corresponding to a reference point shown in FIG. 2. The generation part 33 stores the generated vehicle model in the storage 20.

Figure 2:
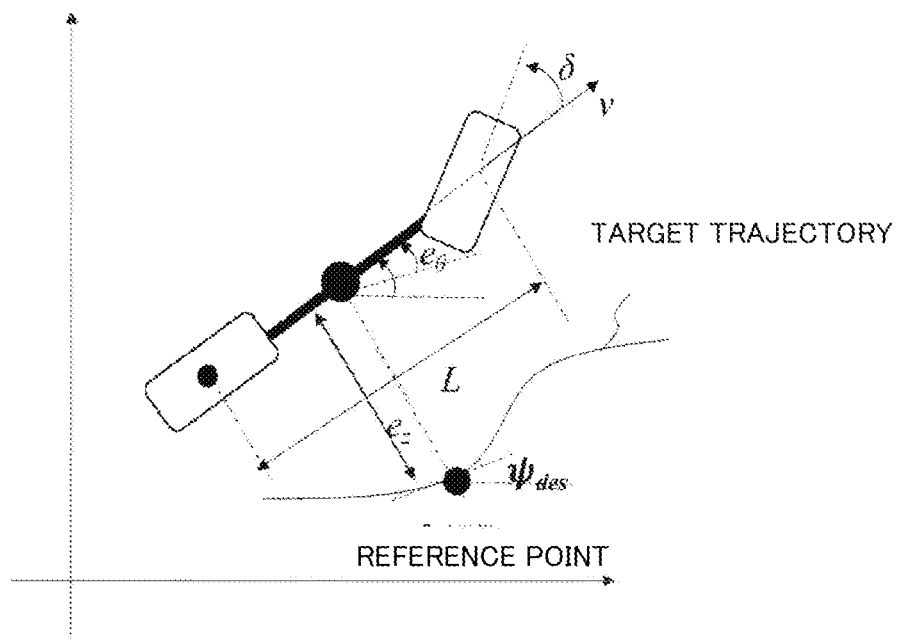
FIG. 2 is a schematic diagram showing a vehicle model.

FIG. 2 is a schematic diagram showing a vehicle model. The vehicle motion corresponding to the reference point shown in FIG. 2 can be expressed by the following Equation 1 using a vehicle velocity v, a lateral deviation $e_z$, an azimuth deviation $e_\theta$, and a curvature $k_r$.

$$\frac{d}{dt}\begin{bmatrix} e_z \\ e_\theta \end{bmatrix} = \begin{bmatrix} v\sin e_\theta \\ \frac{v\tan\delta}{L} - k_r v\cos e_\theta \end{bmatrix} \quad (1)$$

Assuming that the azimuth deviation during following of the target trajectory is extremely small, an equation of the vehicle motion can be linearized as shown in Equation 2.

$$\frac{d}{dt}\begin{bmatrix} e_z \\ e_\theta \end{bmatrix} = \begin{bmatrix} ve_\theta \\ \frac{v\tan\delta}{L} - k_r v \end{bmatrix} \quad (2)$$

Here, a steering angle of a vehicle traveling on any curvature trajectory can be derived from the mechanical relationship of the vehicle, as shown in Equation 3, where L denotes the wheel base of the vehicle.

$$\delta_r = \arctan(Lk_r) \quad (3)$$

When the steering angle of Equation 3 is input to the vehicle, the assumption of Equation 4 is established when the vehicle travels along the target trajectory.

$$\delta = \delta_r + \Delta\delta \quad (4)$$

Then, Equation 5 can be derived by Tyler expansion of tan δ in the vicinity of $\delta_r$.

$$\begin{aligned}\tan\delta &\cong \tan\delta_r + \frac{d\tan\delta}{d\delta}\Delta\delta \\ &= \tan\delta_r + \frac{1}{\cos^2\delta_r}\Delta\delta \\ &= \tan\delta_r + \frac{1}{\cos^2\delta_r}(\delta - \delta_r) \\ &= \tan\delta_r - \frac{\delta_r}{\cos^2\delta_r} + \frac{\delta}{\cos^2\delta_r}\end{aligned} \quad (5)$$

By substituting Equation 5 into Equation 2, the equation of the vehicle motion can be linearized as in Equation 6.

$$\frac{d}{dt}\begin{bmatrix} e_z \\ e_\theta \end{bmatrix} = \begin{bmatrix} 0 & v \\ 0 & 0 \end{bmatrix}\begin{bmatrix} e_z \\ e_\theta \end{bmatrix} + \begin{bmatrix} 0 \\ \frac{v}{L\cos^2\delta_r} \end{bmatrix}\delta - \begin{bmatrix} 0 \\ \frac{v\delta_r}{L\cos^2\delta_r} \end{bmatrix} \quad (6)$$

Assuming that the sample time is sufficiently small and Equation 6 is discretized by the forward Euler method, Equation 7 can be derived. By designing the model prediction control on the basis of Equation 7, it is possible to realize a steering control system capable of handling operations from starting to stopping.

$$\begin{bmatrix} e_z[k+1] \\ e_\theta[k+1] \end{bmatrix} = \begin{bmatrix} dt & v[k] \\ 0 & 1 \end{bmatrix} \begin{bmatrix} e_z[k] \\ e_\theta[k] \end{bmatrix} + \begin{bmatrix} 0 \\ \frac{dtv[k]}{L\cos^2\delta_r[k]} \end{bmatrix} \delta[k] - \begin{bmatrix} 0 \\ \frac{dtv[k]\delta_r[k]}{L\cos^2\delta_r[k]} \end{bmatrix} \quad (7)$$

The calculation part 34 calculates, as an optimal steering angle, a steering angle that minimizes the output value of an evaluation function corresponding to the vehicle model generated by the generation part 33. Here, the evaluation function includes an estimated lateral deviation and an estimated azimuth deviation which are calculated on the basis of the vehicle model, a steering angle, a change amount of the steering angle, a first weighting coefficient of a term corresponding to the estimated lateral deviation, a second weighting coefficient of a term corresponding to the estimated azimuth deviation, a third weighting coefficient of a term corresponding to the steering angle, and a fourth weighting coefficient of a term corresponding to the change amount.

Specifically, the calculation part 34 first inputs the calculated estimated lateral deviation and estimated azimuth deviation, the steering angle, and the change amount of the steering angle to the evaluation function corresponding to the vehicle model based on the vehicle velocity acquired by the first acquisition part 32. The calculation part 34 then calculates the steering angle that minimizes the output value of the evaluation function as the optimal steering angle.

Here, when the state variable x of the state space equation is represented by the following Equation 8, an observed output y is represented by Equation 9, where $e_z$ is the estimated lateral deviation and $e_\theta$ is the estimated azimuth deviation.

$$x = \begin{bmatrix} e_z \\ e_\theta \end{bmatrix} \quad (8)$$

$$y = \begin{bmatrix} e_z \\ e_\theta \end{bmatrix} \quad (9)$$

The calculation part 34 estimates the state variable x using a steady state Kalman filter, and calculates the optimization problem of the model prediction control using the evaluation function shown in the following Equation 10. In Equation 10, p denotes a predicted horizon, δ denotes a steering angle input, Δδ denotes a difference between the steering angle input and the steering angle input of the immediately preceding control period, and "max" and "min", which are suffixes of the input and output variables, denote upper and lower limit values of the signal. $Q_1$ is a first weighting coefficient of a term corresponding to the estimated lateral deviation $e_z$, $Q_2$ is a second weighting coefficient of a term corresponding to the estimated azimuth deviation $e_\theta$, $R_1$ is a third weighting coefficient of a term corresponding to the steering angle δ, and $R_2$ is a fourth weighting coefficient of a term corresponding to the change amount Δδ of the steering angle.

$$J = \int_t^{t+t_p} (Q_1 e_z^2 + Q_2 e_\theta^2 + R_1 \delta^2 + R_2 \Delta\delta^2) d\tau \quad (10)$$

subject to $\delta_{min} \leq \delta[k+k_t] \leq \delta_{max}$ $\Delta\delta_{min} \leq \Delta\delta[k+k_t] \leq \Delta\delta_{max}$ The calculation part 34 performs an optimization calculation for minimizing the output value J of the evaluation function shown in Equation 10 to calculate the steering angle in real time, thereby achieving following of the target trajectory of the vehicle. By calculating the steering angle with the calculation part 34 in this manner, the steering controller 10 can cause the vehicle to travel at a position where the error with respect to the target trajectory is small at the timing of each of a plurality of control periods.

In a case where priority is given to converging the lateral deviation and the azimuth deviation to 0, the calculation part 34 sets the weighting coefficients $Q_1$ and $Q_2$ to be larger than a predetermined value, or sets the weighting coefficients $R_1$ and $R_2$ to be smaller than a predetermined value. The predetermined value is a value set in advance by experiment or the like, for example. When priority is given to reducing the change amount of the steering angle, the calculation part 34 sets $R_2$ to be smaller.

The travel control part 35 causes the vehicle to travel on the basis of the steering angle calculated by the calculation part 34. For example, the travel control part 35 outputs the steering angle calculated by the calculation part 34 to the travel control apparatus 2 at a regular control period, thereby causing the vehicle to travel at the calculated steering angle.

Since the vehicle velocity v is included in the coefficient matrix, the state equation of Equation 7 is a linear parameter dependent on the vehicle velocity. Under the condition that the vehicle velocity is constant, the state equation of Equation 7 is equivalent to a linear time-invariant system. On the other hand, in a case where traveling, such as in autonomous driving, in which a vehicle velocity changes sharply, is assumed, there has been a concern that control accuracy and stability may be degraded with the model prediction control based on Equation 7. In contrast, in order to prevent degradation of path following control at the time of acceleration or deceleration of a vehicle, the steering controller 10 of the present embodiment updates the weighting coefficients of the evaluation function in real time according to a required acceleration at the time of the acceleration or deceleration of the vehicle, as will be described below. The steering controller 10 includes a second acquisition part 36 and an updating part 37 in order to update the weighting coefficients.

The second acquisition part 36 acquires a required acceleration when accelerating or decelerating a vehicle. The required acceleration is an acceleration corresponding to operations of the accelerator and brakes for a driver to accelerate or decelerate the vehicle, for example. The second acquisition part 36 can identify the required acceleration from the driver's operations of the accelerator and brakes detected by the state identifying apparatus 1.

According to the required acceleration acquired by the second acquisition part 36, the updating part 37 updates the weighting coefficients of the evaluation function calculated by the calculation part 34 as the optimal steering angle. In the present embodiment, the updating part 37 updates at least one weighing coefficient among the first weighting coefficient $Q_1$, the second weighting coefficient $Q_2$, the third weighting coefficient $R_1$, and the fourth weighting coefficient $R_2$ according to the required acceleration.

The updating part 37 updates the weighting coefficient in real time according to the required acceleration while the vehicle is traveling (specifically, during automatic steering). By applying the weighting coefficient updated by the updating part 37 to the evaluation function, the calculation part 34 calculates the optimal steering angle in which the updated weighting coefficient has been reflected. The travel control part 35 causes the vehicle to travel on the basis of the optimal steering angle in which the updated weighting coefficient has been reflected. The weighting coefficient is immediately updated at the time of the acceleration or deceleration of the vehicle, and therefore the vehicle is steered on the basis of the optimal steering angle to which the updated weighting coefficient has been reflected. As a result, it is possible to prevent degradation of the path following control at the time of the acceleration or deceleration of the vehicle.

The updating part 37 may update the second weighting coefficient $Q_2$ and the fourth weighting coefficient $R_2$ according to the required acceleration. Specifically, the updating part 37 updates the second weighting coefficient $Q_2$ and the fourth weighting coefficient $R_2$ while values of the first weighting coefficient $Q_1$ and the third weighting coefficient $R_1$ are fixed. Advantages of updating only the second weighting coefficient $Q_2$ and the fourth weighting coefficient $R_2$ are as follows. As a form of a trajectory following error, a deviation (azimuth deviation) occurs between the vehicle and the target trajectory in the traveling direction, and this results in an occurrence of a lateral shift (lateral deviation) from the target trajectory if the vehicle travels without correcting the deviation in the traveling direction. From this, it can be said that if the azimuth deviation can be reduced, the lateral deviation can also be reduced. Therefore, the updating part 37 prioritizes updating of the second weighting coefficient $Q_2$ among the first weighting coefficient $Q_1$ and the second weighting coefficient $Q_2$. On the other hand, when the second weighting coefficient $Q_2$ is updated, the steering angle may change sharply. Therefore, the updating part 37 prevents a sharp change in the steering angle by updating the fourth weighting coefficient $R_2$.

The updating part 37 may reference a lookup table stored in the storage 20 when updating the first weighting coefficient $Q_1$, the second weighting coefficient $Q_2$, the third weighting coefficient $R_1$, and the fourth weighting coefficient $R_2$. The storage 20 stores the lookup table indicating correspondence information in which (i) the magnitude of the required acceleration and (ii) update ranges of the first weighting coefficient $Q_1$, the second weighting coefficient $Q_2$, the third weighting coefficient $R_1$, and the fourth weighting coefficient $R_2$ are associated with each other. The updating part 37 updates the weighting coefficients to the magnitude of the weighting coefficients corresponding to the required acceleration acquired by the second acquisition part 36 by referencing the update ranges included in the correspondence information. By referencing the lookup table in this manner, the first weighting coefficient $Q_1$, the second weighting coefficient $Q_2$, the third weighting coefficient $R_1$, and the fourth weighting coefficient $R_2$ can be easily updated in real time.

The updating part 37 may update all of the first weighting coefficient $Q_1$, the second weighting coefficient $Q_2$, the third weighting coefficient $R_1$, and the fourth weighting coefficient $R_2$ according to the required acceleration. That is, the updating part 37 updates all of the four weighting coefficients according to a change in the velocity of the vehicle. By updating all of the weighting coefficients in this manner, it is possible to effectively prevent degradation of the path following control at the time of the acceleration or deceleration of the vehicle.

In the above description, the updating part 37 updates two weighting coefficients or four weighting coefficients, but the present embodiment is not limited thereto. For example, the updating part 37 may update one of the four weighting coefficients or three weighting coefficients.

Figure 3A:
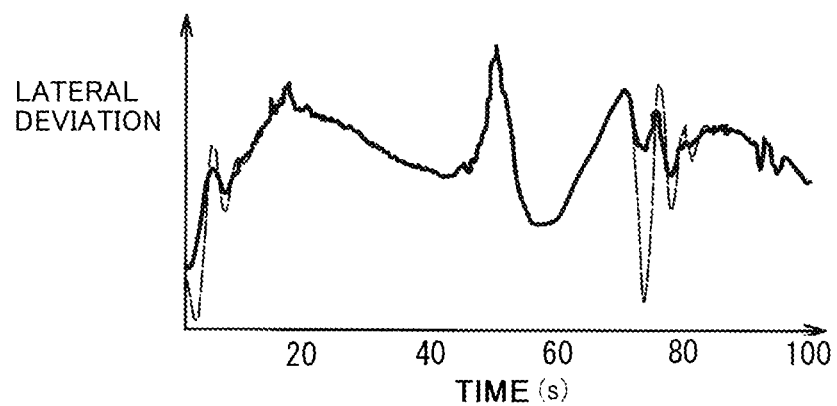
FIGS. 3A and 3B show simulation results.
Figure 3B:
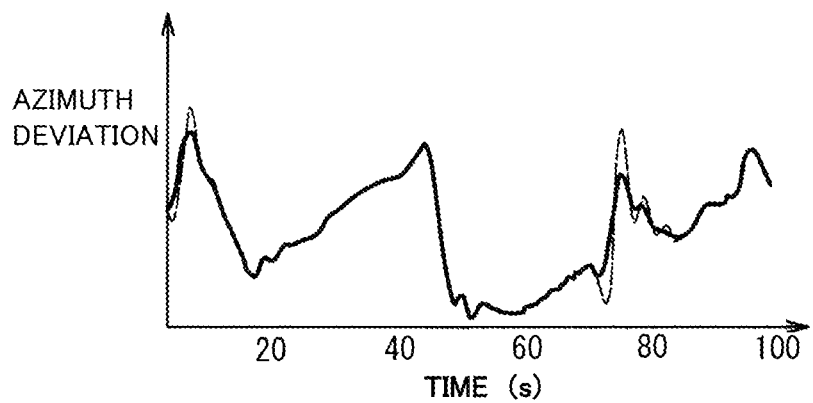

FIGS. 3A and 3B show simulation results. In FIG. 3A, the horizontal axis represents time and the vertical axis represents lateral deviation. In FIG. 3B, the horizontal axis represents time and the vertical axis represents azimuth deviation. In FIG. 3A and FIG. 3B, a broken line shows a control response in a case of a comparative example in which a weighting coefficient is not updated, and a solid line shows a control response in a case where the weighting coefficient is updated as in the present embodiment. In the comparative example, control accuracy deteriorates at the starting of a vehicle (when the time is 0) or at the time of the acceleration or deceleration of the vehicle (when the time is about 70 (s)). On the other hand, in the case where the weighting coefficient is updated as in the present embodiment, the accuracy of the lateral deviation and the azimuth deviation is improved even at the starting of a vehicle or at the time of the acceleration or deceleration of the vehicle. That is, by updating the weighting coefficient in accordance with the acceleration and deceleration of the vehicle, a good control response can be realized.

<Operation Example of the Steering Controller>

Figure 4:
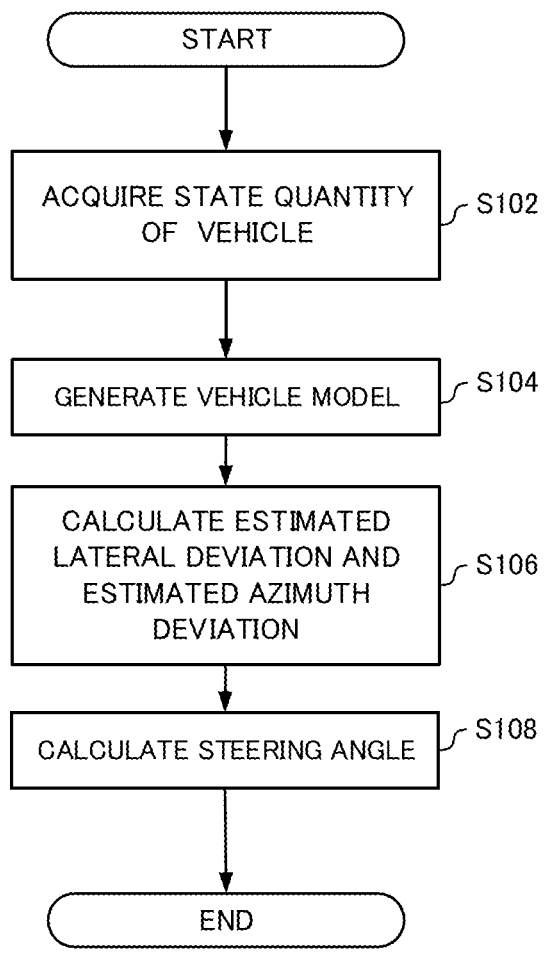
FIG. 4 is a flowchart illustrating an example of a steering angle calculation process.

FIG. 4 is a flowchart showing an example of a steering angle calculation process performed by the steering controller 10. The process shown in FIG. 4 is performed while the vehicle is traveling.

First, the first acquisition part 32 acquires, from the state identifying apparatus 1, a state quantity of a vehicle such as a velocity of the vehicle, a steering angle of the vehicle, a lateral deviation of the vehicle, an azimuth deviation of the vehicle, and a curvature of a road surface (step S102). Next, the generation part 33 generates a vehicle model corresponding to the state quantity of the vehicle acquired by the first acquisition part 32 (step S104).

Next, the calculation part 34 calculates an estimated lateral deviation and an estimated azimuth deviation by inputting the velocity, the steering angle, the lateral deviation, the azimuth deviation, and the curvature to a state space model corresponding to the vehicle model generated by the generation part 33 (step S106).

Next, the calculation part 34 inputs the estimated lateral deviation and the estimated azimuth deviation calculated by the calculation part 34 to an evaluation function corresponding to the vehicle model generated by the generation part 33, and calculates a steering angle that minimizes an output value of the evaluation function (step S108). The steering controller 10 repeats the processes of steps S102 to S108 described above until the vehicle stops. By doing this, the steering angle is optimized during traveling of the vehicle.

Figure 5:
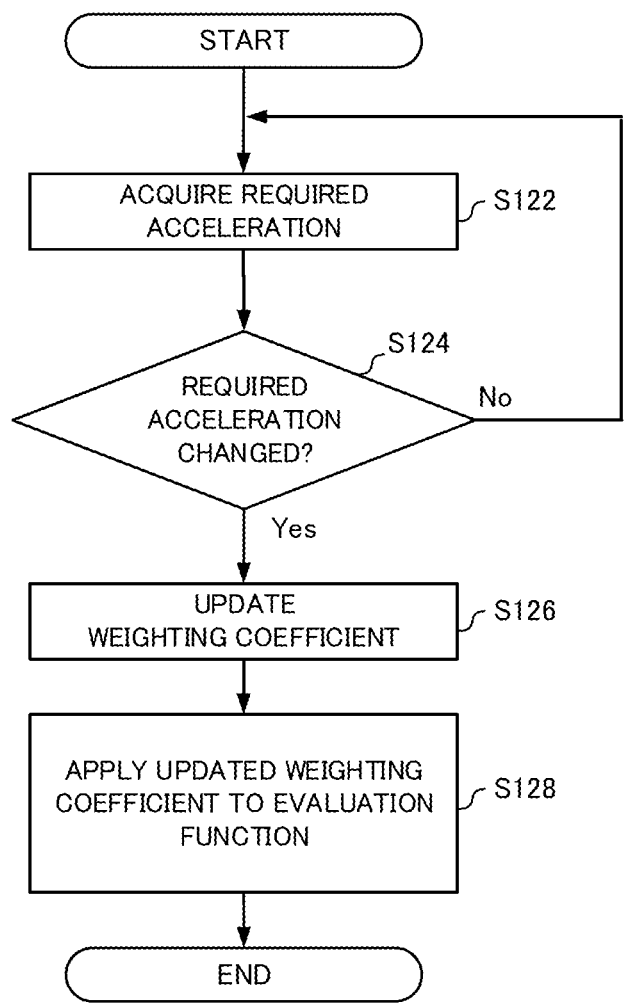
FIG. 5 is a flowchart illustrating an example of a process of updating a weighting coefficient.

FIG. 5 is a flowchart showing an example of a process of updating a weighting coefficient performed by the steering controller 10. The processing of FIG. 5, as well, is performed while the vehicle is traveling. First, the second acquisition part 36 acquires a required acceleration of a traveling vehicle (step S122). For example, the second acquisition part 36 acquires, from the state identifying apparatus 1, a required acceleration at the time of accelerating or decelerating the vehicle.

Next, the updating part 37 determines whether or not the required acceleration acquired by the second acquisition part 36 has changed (step S124). When the required acceleration has changed in step S124 (Yes), the updating part 37 updates at least one weighting coefficient among the first weighting coefficient $Q_1$, the second weighting coefficient $Q_2$, the third weighting coefficient $R_1$, and the fourth weighting coefficient $R_2$ of the evaluation function corresponding to a vehicle model generated by the generation part 33 according to the required acceleration (step S126).

Next, the calculation part 34 applies the updated weighting coefficient to the evaluation function (step S128). In step S108, the calculation part 34 calculates a steering angle using the evaluation function in which the updated weighting coefficient has been reflected. By doing this, the calculation part 34 calculates an optimal steering angle while the weighting coefficient is updated. The steering controller 10 repeats the processes of steps S122 to S128 described above until the vehicle stops.

Effects of the Present Embodiment

The steering controller 10 of the present embodiment calculates, as the optimal steering angle, the steering angle that minimizes the output value of the evaluation function corresponding to the vehicle model. In addition, the steering controller 10 acquires the required acceleration when accelerating or decelerating the vehicle, and updates at least one weighting coefficient among the first weighting coefficient $Q_1$, the second weighting coefficient $Q_2$, the third weighting coefficient $R_1$, and the fourth weighting coefficient $R_2$ of the evaluation function according to the acquired required acceleration. By doing this, the steering controller 10 calculates the optimal steering angle by applying the weighting coefficient updated according to the required acceleration to the evaluation function when the vehicle accelerates or decelerates. As a result, it is possible to prevent degradation of the path following accuracy at the time of the acceleration or deceleration of the vehicle, as compared with the case where the weighting coefficient is not updated.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A steering controller which causes a vehicle to follow a target trajectory; the steering controller comprising:
a first acquisition part that acquires a velocity of the vehicle, a steering angle of the vehicle, a lateral deviation with respect to the target trajectory of the vehicle, an azimuth deviation that is a difference between a direction of the vehicle and a target direction of the vehicle, and a curvature of a road surface on which the vehicle travels, at predetermined intervals;
a generation part that generates a vehicle model indicating a relationship between the velocity, the steering angle, the lateral deviation, the azimuth deviation, and the curvature;
a calculation part that calculates, as an optimal steering angle, the steering angle of the vehicle that minimizes an output value of an evaluation function including an estimated lateral deviation and an estimated azimuth deviation calculated on the basis of the vehicle model, the steering angle of the vehicle, a change amount of the steering angle of the vehicle, a first weighting coefficient of a term corresponding to the estimated lateral deviation, a second weighting coefficient of a term corresponding to the estimated azimuth deviation, a third weighting coefficient of a term corresponding to the steering angle of the vehicle, and a fourth weighting coefficient of a term corresponding to the amount of change;
a second acquisition part that acquires a required acceleration when accelerating or decelerating the vehicle; and
an updating part that updates at least one weighting coefficient among the first weighting coefficient, the second weighting coefficient, the third weighting coefficient, and the fourth weighting coefficient according to the required acceleration.

2. The steering controller according to claim 1, wherein the updating part updates the second weighting coefficient and the fourth weighting coefficient according to the required acceleration.

3. The steering controller according to claim 2, wherein the updating part updates the second weighting coefficient and the fourth weighting coefficient according to the required acceleration while values of the first weighting coefficient and the third weighting coefficient are fixed.

4. The steering controller according to claim 1, wherein the updating part updates all of the first weighting coefficient, the second weighting coefficient, the third weighting coefficient, and the fourth weighting coefficient according to the required acceleration.

5. The steering controller according to claim 1, further comprising:
a storage that stores correspondence information in which (i) the magnitude of the required acceleration and (ii) update ranges of the first weighting coefficient, the second weighting coefficient, the third weighting coefficient, and the fourth weighting coefficient are associated with each other, wherein
the updating part references the update ranges included in the correspondence information, and updates the weighting coefficients to the magnitude of the weighting coefficients corresponding to the required acceleration acquired by the second acquisition part.

6. The steering controller according to claim 1, wherein the calculation part calculates the optimal steering angle by setting the first weighting coefficient and the second weighting coefficient to be larger than a predetermined value and setting the third weighting coefficient and the fourth weighting coefficient to be smaller than the predetermined value in the evaluation function.

7. The steering controller according to claim 1, further comprising:
a travel control part that controls traveling of the vehicle on the basis of the optimal steering angle calculated by the calculation part by applying the weighting coefficients updated by the updating part to the evaluation function.

8. A steering control method, executed by a computer, for causing a vehicle to follow a target trajectory, the steering control method comprising:
acquiring a velocity of the vehicle, a steering angle of the vehicle, a lateral deviation of the vehicle with respect to the target trajectory, an azimuth deviation that is a difference between a direction of the vehicle and a target direction of the vehicle, and a curvature of a road surface on which the vehicle travels, at predetermined intervals;
generating a vehicle model indicating a relationship between the velocity, the steering angle of the vehicle, the lateral deviation, the azimuth deviation, and the curvature;
calculating, as an optimal steering angle, the steering angle of the vehicle that minimizes an output value of an evaluation function including an estimated lateral deviation and an estimated azimuth deviation calculated on the basis of the vehicle model, the steering angle of the vehicle, a change amount of the steering angle of the vehicle, a first weighting coefficient of a term corresponding to the estimated lateral deviation, a second weighting coefficient of a term corresponding to the estimated azimuth deviation, a third weighting coefficient of a term corresponding to the steering angle of the vehicle, and a fourth weighting coefficient of a term corresponding to the change amount;

acquiring a required acceleration when accelerating or decelerating the vehicle; and updating at least one weighting coefficient among the first weighting coefficient, the second weighting coefficient, the third weighting coefficient, and the fourth weighting coefficient according to the required acceleration.

* * * * *